April 18, 1950  M. F. ZIFFERER  2,504,943
PICKUP BROOM RAKE
Filed Sept. 14, 1945  2 Sheets-Sheet 2
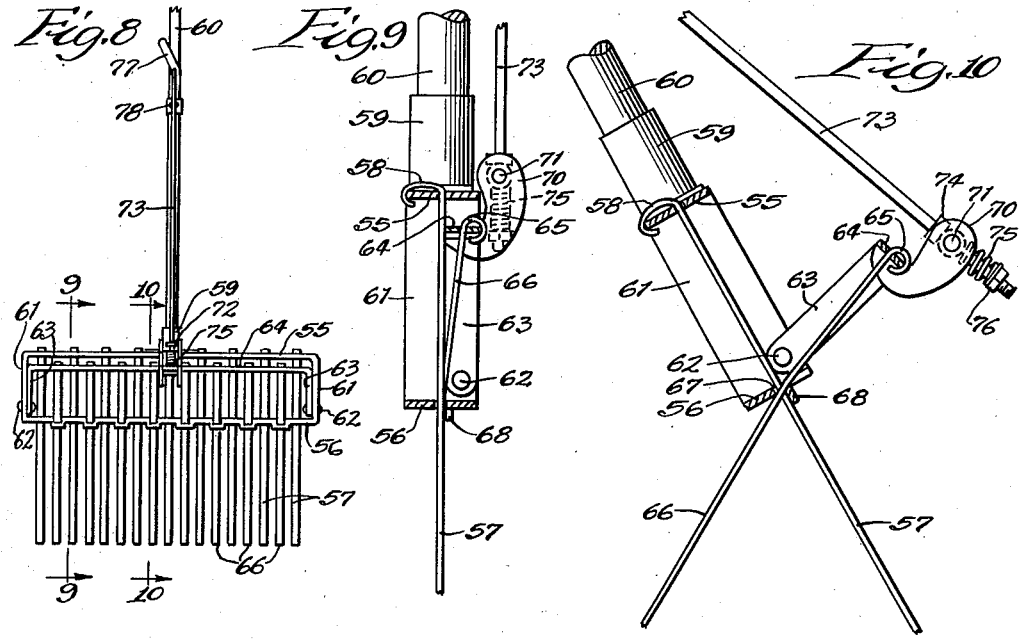
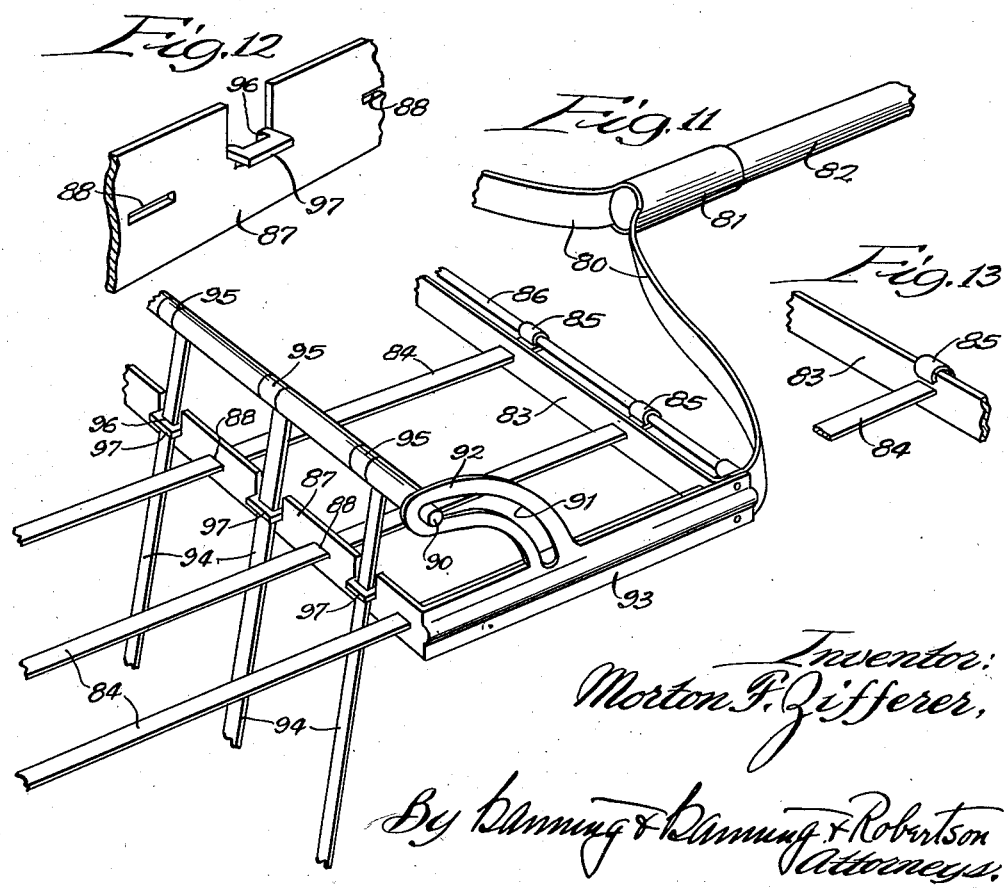
Inventor:
Morton F. Zifferer,
By Banning & Banning & Robertson
Attorneys.

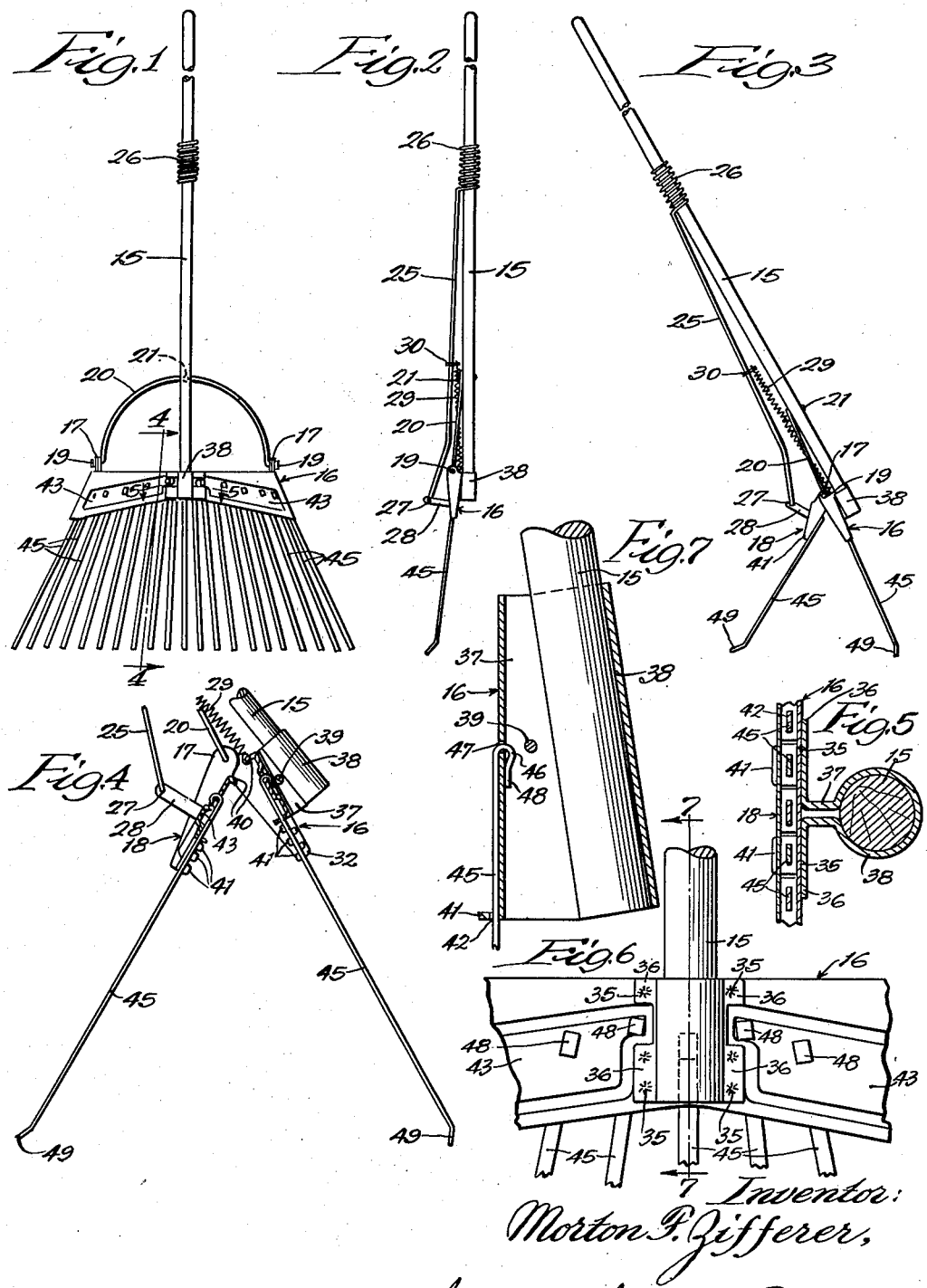

Patented Apr. 18, 1950

2,504,943

UNITED STATES PATENT OFFICE 2,504,943

PICKUP BROOM RAKE

Morton F. Zifferer, York, Pa., assignor to New Standard Corporation, Mount Joy, Pa., a corporation of Pennsylvania Application September 14, 1945, Serial No. 616,197

2 Claims. (Cl. 56—400.12)

My invention relates to a rake of the broom type in which is incorporated means whereby it may serve to pick up a quantity of leaves or rakings to facilitate transportation thereof from one place to another. For this purpose the rake is provided with a fixed head forming a mounting for one set of aligned tines, and with a second head, swingingly mounted with respect to the first, forming a mounting for a second set of aligned tines which are adapted to interfit with those of the first set whereby all the tines of both sets may occupy operative positions in alignment.

According to this invention, the swinging rake head may be operated to move away from the fixed head to an open position in which the two sets of tines occupy diverging positions, one with respect to the other. When so positioned, the ends of the two sets of tines may be engaged with the turf of level ground whereby to support the rake in an upright position. Also when the one rake head is opened with respect to the other, the rake may be brought down upon a pile or quantity of leaves or other light rakings, and then operated to clutch such leaves or rakings to facilitate their transportation to a different location. After the swinging head has again been opened to release the load, it may, if needed, be further operated to produce a cleaning out and discharge of any leaves or rakings still adhering.

In a rake of this general character I have made certain improvements having to do with simplicity and resulting economy in manufacture, general dependability, and serviceability for the intended work. These features of improvement which will be hereinafter set forth in detail are illustrated in the accompanying drawings wherein:

Figure 1 is a view in front elevation of the rake in its entirety;

Fig. 2 is a side elevation thereof;

Fig. 3, which is a similar view, shows the rake head opened with the two sets of tines in diverging relation;

Fig. 4 is an enlarged detail in section taken on line 4—4 of Fig. 1;

Fig. 5 is a fragmentary detail in section, enlarged, taken on line 5—5 of Fig. 1;

Fig. 6 is a fragmentary detail in elevation, enlarged, of the central portion of the fixed rake head;

Fig. 7 is a fragmentary detail in section, enlarged, taken on line 7—7 of Fig. 6;

Fig. 8 is a front elevation of a broom rake of modified construction;

Figs. 9 and 10 are enlarged details taken on line 9—9 and 10—10, respectively, of Fig. 8;

Fig. 11 is a fragmentary detail in perspective of the two heads of a rake having a still different construction;

Fig. 12 is a similar view of the bottom bar of the fixed head; and

Fig. 13, which is a similar view of the top bar of the head frame, shows a possible alternative connection for the associated tines.

The principal parts of my rake are an elongated handle 15, of wood, bamboo, metal, or other suitable material, joined at one end to a fixed head 16, having at opposite ends flanges 17 which terminate upwardly in mounting ears whereon is carried a swinging head 18. The ears of each mounting are pivotally connected by one of two out-turned ends 19 of an arcuate wire brace 20 which is medially connected to the handle at 21. For operating the swinging head, I may employ a rod 25 one end of which is formed into a handle-coil 26 adapted to surround the handle with a sliding fit thereon; the opposite rod end is pivotally joined at 27 to an arm 28 which is affixed to the swinging head 18. An expansible spring 29 is connected at one end to a disc 30 adjustably fitted upon the operating rod 25, the opposite spring end being connected to the fixed head 16 to exert a tension which normally holds the swinging rake head in its closed position. The convolutions of the handle-coil 26 form a combined slide and hand grip for actuating the operating rod 25. This rod is outset from the handle 15 to provide an intervening space for the spring 29 and the disc 30 which forms an adjustable connection between the upper end of the spring 29 and the operating rod. Such a connection provides for controlling the tensioning of the spring which tends to maintain the swingable head and the tines carried thereby in their closed position.

The fixed head 16 which may be made of sheet metal has connected thereto, as by spot welds 35, a pair of out-turned ears 36, which extend from a two-ply neck 37 that is extended laterally from a collar 38 which closely surrounds the handle 15 at or near its lower end. A tightening bolt or screw 39 may be passed through the neck to draw the collar tightly against the handle. By some such means as this, the fixed head may be carried fast at the lower end of the handle.

The two rake heads 16 and 18 are shaped generally alike, each having a straight flange 40 along its top edge, the flanges 17 inclined outwardly and downwardly at opposite ends, and a plurality of tabs 41 extending laterally along the bottom inclining upwardly from each end toward the center whereby the vertical dimension of the head is the minimum in the center region. The flanges while not essential provide a desired reenforcement and when extended toward each other, perhaps in interlapping relation, serve to enclose the space between the two rake heads and so protect the parts exposed therewithin as will soon be explained. The tabs on the two heads are staggered so as to occupy interfitting positions, and each is formed therethrough with a closed slot 42, all of the slots being in alignment when one rake head is closed upon the other.

For further reenforcement and for a mechanical purpose as well, each head may be embossed to provide a raised longitudinal panel 43. Through each of the tab slots 42 is extended a resilient tine 45 whose upper end is bent around at 46 to pass through a slot 47 in one of the head panels, the tine end 48 then being flattened down and clinched, as it were, against the outer face of the associated head. Each tine, therefore, traverses two slots in the head, these slots being so positioned that the several tines in each head will fan out divergingly as clearly indicated in Fig. 1. The positions of the tines lengthwise of the two heads are staggered, due to the staggered interfit of the tabs 41, so that the tines also may interfit with uniform spacing, as illustrated in Fig. 3, where it will be noted both sets of tines are aligned, i. e. arranged in a single row so as to operate the same as the conventional rake. The lower tine ends of both sets are preferably curved or angled rearwardly at 59 in the same direction so as to enhance the raking action when engaged with leaves or other loose material. When so used, the rake will function the same as the usual raking implement, and since the weight occasioned by the extra parts necessary for the swinging head is but very little indeed, there will be no noticeable difference in the handling of this tool when in use.

To pick up leaves or other collected material, the handle-coil 26 is pulled up against the tension of the spring 29, thereby swinging out the head 18 away from the fixed head 16; in this condition the open rake is placed down and over the pile of leaves or other loose material and the swinging head is allowed to move toward the other whereby to compress and grip between the two sets of tines the material that is caught between them. At this stage the rake together with the load that is suspended between its two sets of tines, may be removed elsewhere for release of the low in response to a momentary further separation of the two heads of the rake in the manner already described.

Passing now to the modified construction of Figs. 8 to 10, the fixed head is in the form of a rectangular strap frame having top and bottom bars 55 and 56, respectively, each slotted at opposite points to receive a plurality of tines 57 whose top ends 58 are bent around to engage the proximate bar after the manner of a hook. In some such way as this the tines may be supported in operative position. Extending outwardly from the top bar at its center point is a socket 59 into which the lower end of the handle 60 may be fitted and secured.

The frame ends 61 at opposite points near the bottom bar support pins 62 in pivotal connection with arms 63 which extend in parallelism from the ends of a bar 64, this bar, together with its two arms, constituting a swinging head which supports the bent top ends 65 of a second set of tines 66. As by means of slots in the bar 64, the bent top ends 65 of the tines 66 may be secured fixedly in place. Spaced supports for the tines of the swinging head are provided by slots 67 in the bottom bar 56 of the fixed head, each slot being so sized as to permit of sliding and angular movement of the tine supported therein, as required by pivotal movements of the swinging head. Desirably a lip 68 is laterally struck out from the bar 56 at a point proximate to each slot 67, to lie alongside the tine passing therethrough to furnish an extended guiding support therefor.

A pair of spaced bracket arms 70 which are fixedly connected to the bar 64 of the swinging head, extend laterally and upwardly therefrom to pivotally support opposed trunnions 71 of a plate 72 through which is passed an operating rod 73 fitted with a collar 74 bearing against one side of the plate and with a spring 75 against the other. An adjusting nut 76 is in screw-threaded connection with the rod adjacent its lower end. At its upper end the rod is pivotally joined to a lever 77 which in turn is pivotally connected to the handle.

In this construction the swinging head supports only the upper ends of one set of tines which elsewhere are slidingly supported also by the fixed head wherein the other set of tines is solely supported. As in the form of rake already described in connection with Figs. 1–7, the tines of one set are staggered with respect to those of the other set so as to interfit therewith, all in alignment when the swinging head is closed (see Fig. 9). In the construction of Figs. 8–10, however, the tines of one set cross the tines of the other set when the swinging head is open (see Fig. 10), and the operating rod, acting through the spring 75 acts to hold the swinging head tightly in closed position, the tines 57 serving as a stop to engage the bar 64 when this position is reached.

A further construction is indicated in Figs. 11–13 to which reference will now be made. Here I have shown a fixed head in the form of a strap frame having its end portions 80 converged to join a socket 81 into which is fitted and secured the end of the handle 82. A top bar 83 which extends between opposite ends of the head is secured thereto in any approved way. This bar is slotted to receive tines 84 whose top ends 85 are bent around to grip a rod 86 by which they are secured fixedly in place. As suggested in Fig. 13, the rod 86 may be omitted in which case the bent top ends 85 will grip the top bar 83 instead. The rod ends are supported by the head ends in any suitable way. Through the bottom bar 87 of the strap frame are provided other complementary slots 88 through which the tines are extended to derive support at forward points.

The swinging head comprises a rod 90 mounted to slide at opposite ends in arcuate slots 91, each formed in a bracket 92 which extends outwardly from an end plate 93 that is affixed to the proximate end of the fixed head. A set of tines 94 have their upper ends bent around at 95 to encircle the rod 90, and elsewhere are slidingly extended through slots 96 in the bottom bar 87 of the fixed head. These latter slots include also a lip 97 which is struck outwardly whereby to guide the confined tines in their angular sliding movements. In use, the rod 90 may be shifted to either end of the arcuate slot 91 whereby to swing the tines 94 to open or closed positions, the former being illustrated in Fig. 12. An operating rod (not shown), the same as already shown in connection with Figs. 8-10, may be employed to move the swinging head, i. e. the rod 90, to its different positions. When closed, both sets of tines will be interfitted and aligned, the same as in the constructions already described.

It is a feature of my invention that the two rake heads cooperate as one in that they furnish support for a plurality of tines all aligned and having free ends curved or bent in the same direction, and that this is accomplished by a construction which is substantially as light as would be a conventional comparable rake of the broom type. Furthermore, the overall size of the rake structure differs very little, if any, from comparable rakes in which but a single head is used. In the form of Figs. 1-7 a light sheet metal, reenforced by embossed panels and by flanges is employed, whereas in the remaining forms an open framework provided by one or more straps is used. I provide in each case two complementary heads connected together for relative movement, each head mounting one set of tines which are staggered with respect to the other set, the two sets of tines occupying interfitting raking positions in alignment when the heads are moved to one position and diverging pick-up positions when the heads are moved to an opposite position. The tines may be made of spring steel, and their secured ends may be bent either hot or cold, according to the requirements of the steel which is used. Also other suitable materials, such as bamboo, may optionally be employed therefor. This same comment applies to other parts of the rake, such as the heads, which, with a view to lightness, may optionally be produced from magnesium or aluminum, just to mention two available materials for the purpose.

I claim:

1. In a pick-up rake, the combination of a handle mounting at one end a head, a plurality of tines secured at one end to the head, a second head associated with the first head, a plurality of tines secured at one end to the second head and staggered with respect to those in the first head and adapted to interfit in alignment therewith, and guides proximate to the secured ends of one set of tines and slidably receiving the other set of tines and forming a sliding pivotal connection between the two heads.

2. In a pick-up rake, the combination of a handle mounting at one end a head, a plurality of tines secured at one end to the head, a second head associated with the first head, a plurality of tines secured at one end to the second head and staggered with respect to those in the first head and adapted to interfit in alignment therewith, and guides carried by one of the heads and slidably receiving the tines of the other head and forming a sliding pivotal connection between the two heads.

MORTON F. ZIFFERER.

REFERENCES CITED

The following references are of record in the file of this patent:

UNITED STATES PATENTS

| Number | Name | Date |
| --- | --- | --- |
| 51,893 | Eaton | Jan. 2, 1866 |
| 1,182,153 | Ellwein | May 9, 1916 |
| 1,362,065 | Walker | Dec. 14, 1920 |
| 1,869,647 | Anderson | Aug. 2, 1932 |
| 1,939,475 | Walsh | Dec. 12, 1933 |
| 1,970,616 | Montan | Aug. 21, 1934 |
| 2,136,849 | Hembree | Nov. 15, 1938 |
| 2,268,066 | Brooke | Dec. 30, 1941 |